(12) United States Patent
Lai

(10) Patent No.: US 8,230,808 B2
(45) Date of Patent: Jul. 31, 2012

(54) PET FOOD DISPENSER

(76) Inventor: Chih-Cheng Lai, Taipei (TW)

( * ) Notice: Subject to any disclaimer, the term of this patent is extended or adjusted under 35 U.S.C. 154(b) by 296 days.

(21) Appl. No.: 12/793,648

(22) Filed: Jun. 3, 2010

(65) Prior Publication Data

US 2011/0297093 A1 Dec. 8, 2011

(51) Int. Cl.
*A01K 5/00* (2006.01)
(52) U.S. Cl. .............. 119/51.01; 119/61.5; 119/707; 222/463
(58) Field of Classification Search .............. 119/51.01, 119/51.02, 51.5, 52.1, 52.2, 53, 707, 51.13, 119/61.5, 61.54, 61.55, 52.4–54, 61.2; 222/181.1, 222/181.2, 457.5, 463, 189.02, 189.04
See application file for complete search history.

(56) References Cited

U.S. PATENT DOCUMENTS

| | | | |
|---|---|---|---|
| 4,322,017 A * | 3/1982 | Lowdermilk | 222/43 |
| 4,823,738 A * | 4/1989 | Gold | 119/51.01 |
| 6,167,841 B1 * | 1/2001 | Ho | 119/61.54 |
| 7,278,374 B2 * | 10/2007 | Mann | 119/710 |
| 8,011,323 B2 * | 9/2011 | Vaughn et al. | 119/72 |
| 8,074,602 B2 * | 12/2011 | Laliberte | 119/57.92 |
| 2010/0012041 A1 * | 1/2010 | Wechsler | 119/52.4 |
| 2011/0083608 A1 * | 4/2011 | Markham et al. | 119/51.01 |
| 2011/0226187 A1 * | 9/2011 | Bertsch | 119/61.55 |

* cited by examiner

*Primary Examiner* — Kimberly Berona
*Assistant Examiner* — Danielle Clerkley
(74) *Attorney, Agent, or Firm* — Hershkovitz & Associates, LLC

(57) ABSTRACT

A pet food dispenser has a container, a bottom lid and a receiving plate. The bottom lid is covered on a bottom opening of the container and has multiple through holes. The receiving plate is connected to the bottom lid. A gap is formed between the receiving plate and the bottom lid. The pet foods in the container drop out from the through holes of the bottom lid. Because the receiving plate collects dropped pet food, only some pet food is released for the pets to eat. The pets need to push the pet food dispenser to topple and roll so that more and more pet food is released. Therefore, the pet food dispenser efficiently leads the pets to move more by using food to attract the pets.

4 Claims, 5 Drawing Sheets

PET FOOD DISPENSER

BACKGROUND OF THE INVENTION

1. Field of the Invention

The present invention relates to a pet food dispenser, especially to a pet food dispenser enticing pets to move when eating.

2. Description of the Prior Arts

With lifestyle changes, pets are becoming increasingly important to people. Many pets, such as dogs, cats and the like, are kept indoors so opportunity and space to exercise is limited and the pets may gain weight and become overweight, which is not healthy for pets. Therefore, solutions to motivate pets to exercise are an important issue.

SUMMARY OF THE INVENTION

The main objective of the present invention is to provide a pet food dispenser that entices pets to move while eating. The pet food dispenser has a container, a bottom lid and a receiving plate. The bottom lid covers a bottom opening of the container and has multiple through holes. The receiving plate is connected to the bottom lid. A gap is formed between the receiving plate and the bottom lid. Pet food in the container drops out from the through holes of the bottom lid. Because the receiving plate collects dropped pet food, pets must move the dispenser obtain more pet food to eat. Therefore, the pet food dispenser efficiently forces pets to move by using food.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
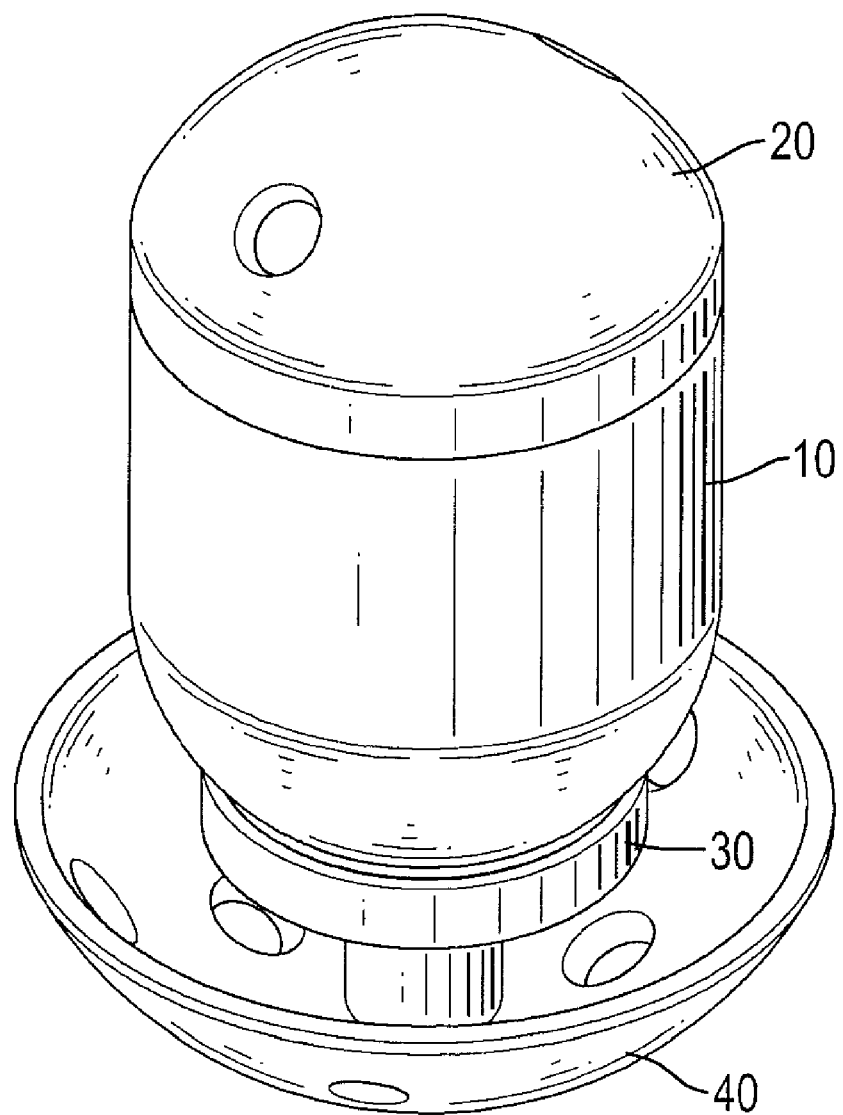
FIG. 1 is a perspective view of a pet food dispenser in accordance with the present invention.
Figure 2:
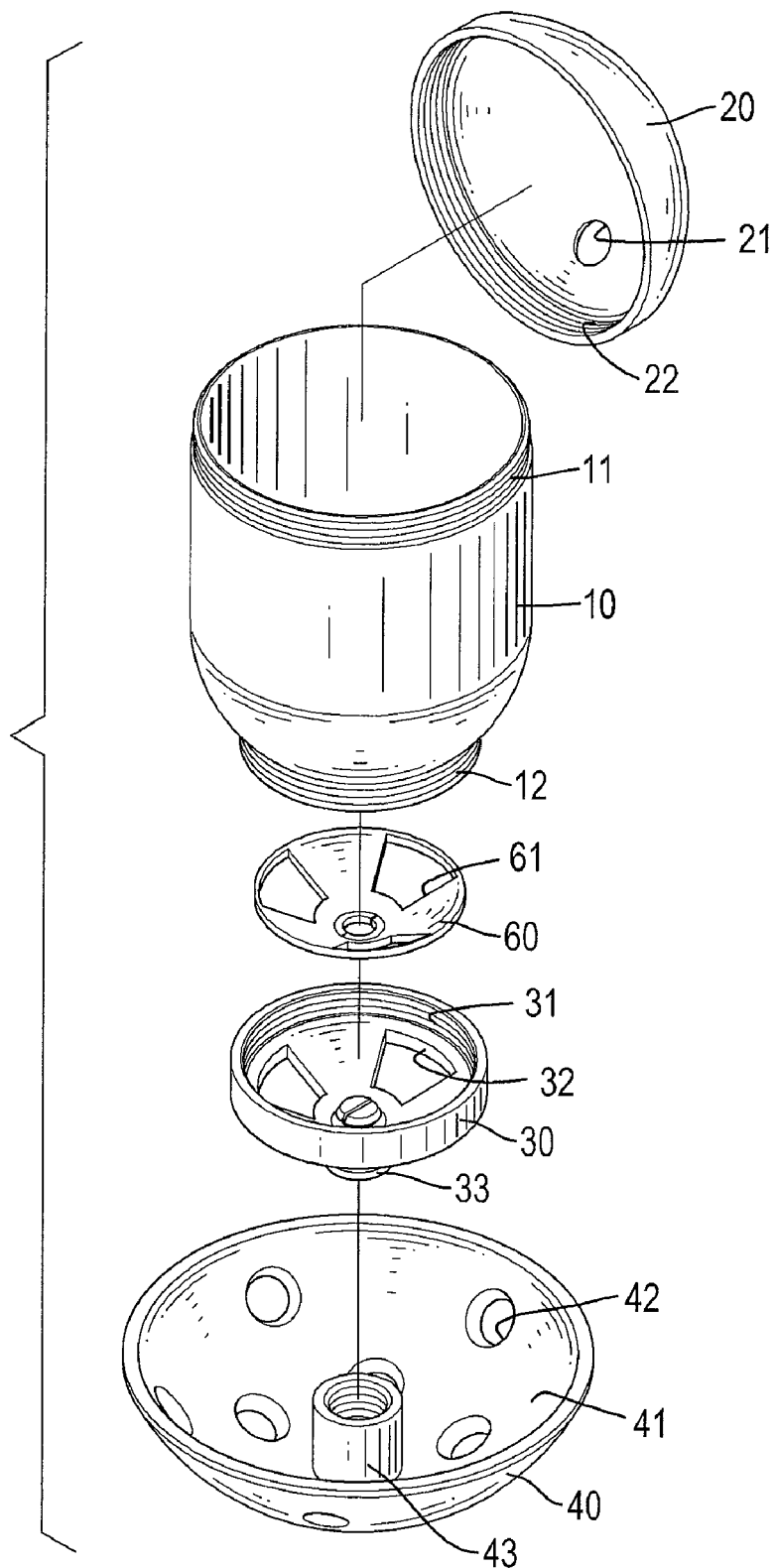
FIG. 2 is an exploded perspective view of the pet food dispenser in FIG. 1.

With reference to FIGS. 1 and 2, a pet food dispenser in accordance with the present invention comprises a container 10, a top lid 20, a bottom lid 30 and a receiving plate 40.

The container 10 is hollow and has a top opening and a bottom opening. The container 10 may have a top threaded part 11 and a bottom threaded part 12 respectively formed on a sidewall of the container 10.

The top lid 20 is mounted detachably on and covers the top opening of the container 10 and has multiple orifices 21 formed through the top lid 20 to facilitate grip. The top lid 20 may have an inner threaded part 22 screwed on the top threaded part 11 of the container 10.

Figure 3:
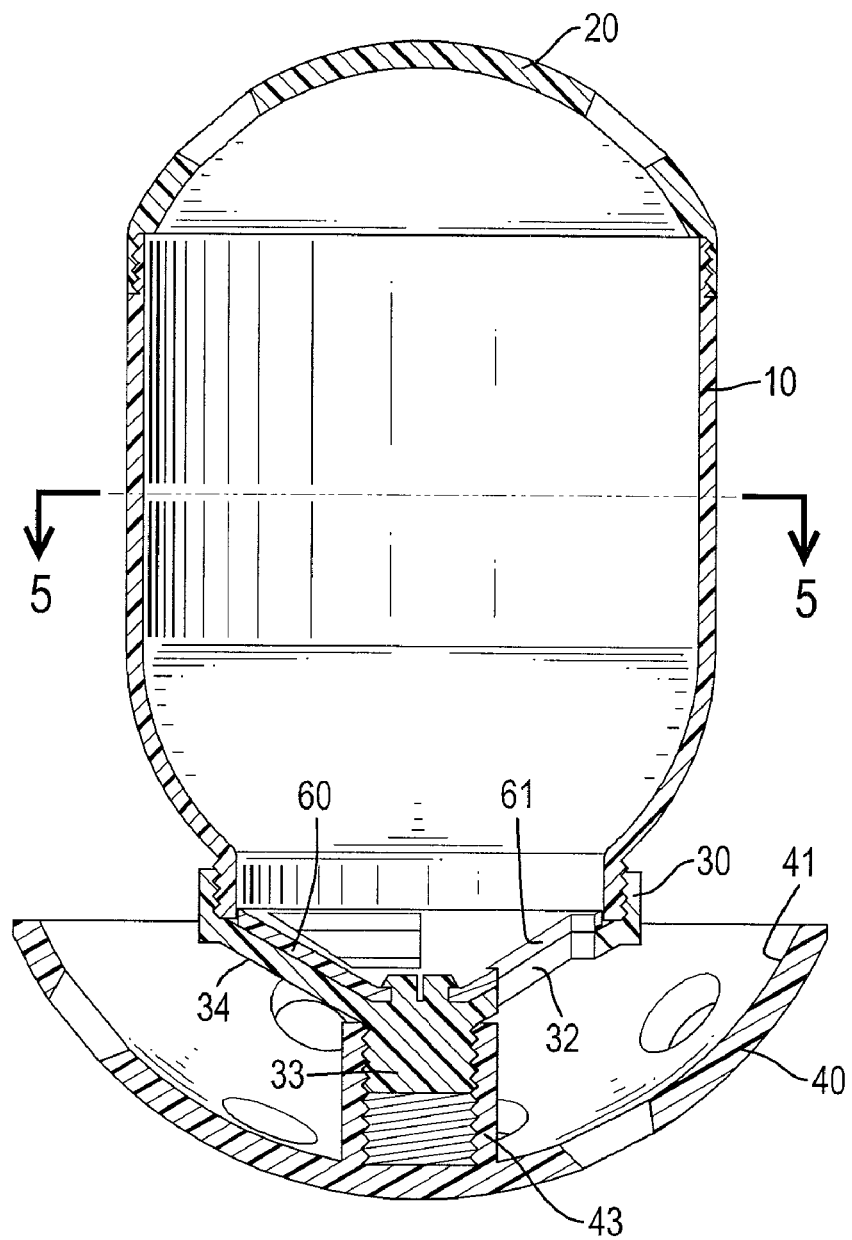
FIG. 3 is a side view in partial section of the pet food dispenser in FIG. 1.

With further reference to FIG. 3, the bottom lid 30 is mounted on and covers the bottom opening of the container 10. The bottom lid 30 may have an inner threaded part 31 screwed on the bottom threaded part 12 of the container 10. The bottom lid 30 has multiple through holes 32 formed therethrough and communicating with the bottom opening of the container 10. The bottom lid 30 has a connecting protrusion 33 formed on an outer surface 34 thereof and having an outer threaded part.

The receiving plate 40 is curved, is connected to the bottom lid 30 and has an inner surface 41 and multiple through holes 42. The inner surface 41 of the receiving plate 40 is separated from the outer surface 34 of the bottom lid 30 to form a gap between the receiving plate 40 and the bottom lid 30. The through holes 42 are formed through the receiving plate 40. The receiving plate 40 has a mounting tube 43 formed on the inner surface 41 and mounted around the connecting protrusion 33 of the bottom lid 30. The mounting tube 43 may have an inner threaded part to screw on the outer threaded part of the connecting protrusion 33.

Figure 4:
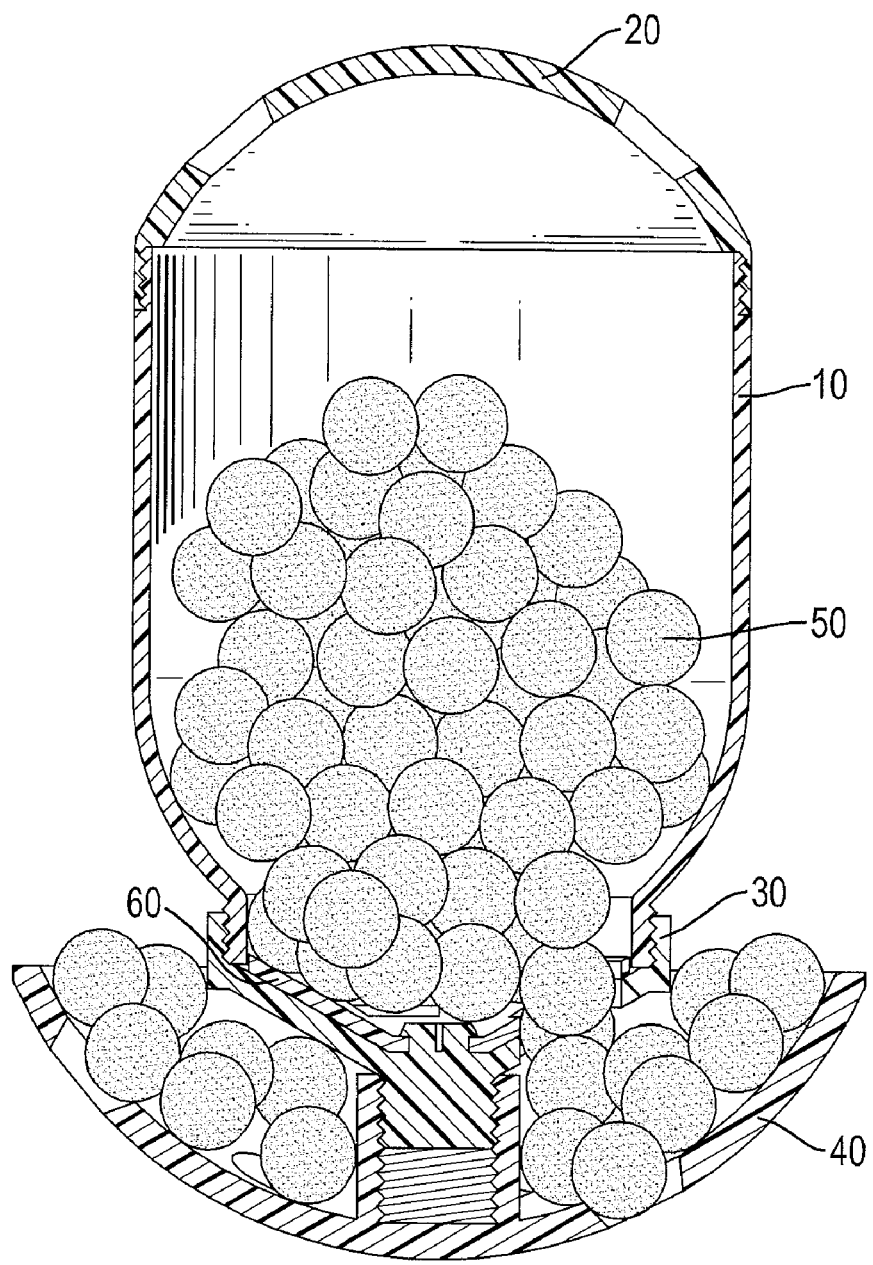
FIG. 4 is an operational side view in partial section of the pet food dispenser in FIG. 1 filled with pet food.

With further reference to FIG. 4, pet food 50 is put into the container 10 from the top opening when the top lid 20 is detached. The smell of the pet food 50 dissipates from the orifices 21 of the top lid 20 to attract pets. Because the through holes 32 of the bottom lid 30 communicate with the bottom opening of the container 10, the pet food 50 drops out from the through holes 32 into the cavity between the receiving plate 40 and the bottom lid 30. Since the receiving plate 40 collects such fallen pet food 50, only a little pet food 50 is released or drops out from the through holes 42 of the receiving plate 40 for the pets to eat. The pets need to push the pet food dispenser as described to topple and roll so that more and more pet food 50 is released. Therefore, the pet food dispenser as described efficiently leads the pets to move more by using food to attract the pets. Moreover, because the receiving plate 40 is curved, the pet food dispenser as described is easier to be pushed to topple and roll and is moved as a tumbler that rights itself when pushed over by the pets.

Figure 5:
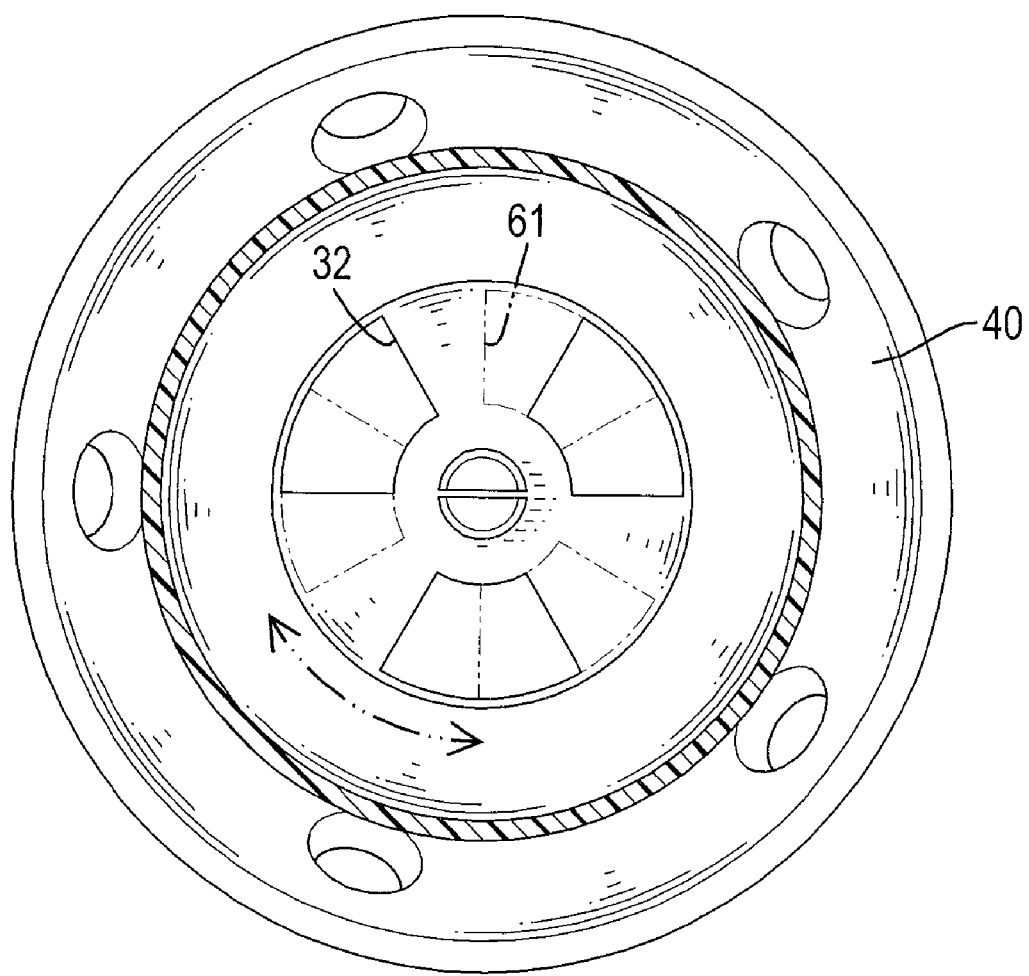
FIG. 5 is a top view in partial section of the pet food dispenser along line 5-5 in FIG. 3.

With reference to FIGS. 2, 4 and 5, the pet food dispenser as described may comprise a distribution panel 60. The distribution panel 60 is attached to the container 10 and is mounted between the bottom opening of the container 10 and the bottom lid 30. The distribution panel 60 has multiple distributing holes 61 formed therethrough and selectively aligning with the through holes 32 of the bottom lid 30. Slightly rotating the container 10 changes overlapping area between the distributing holes 61 of the distribution panel 60 and the through holes 32 of the bottom lid 30. Therefore, the user rotates the container to adjust the ability for the pet food dispenser as described to allow the pet food to drop out. Moreover, when pet food of different sizes is used, the distribution panel 60 helps to adjust a path adapted for different pet foods.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pet food dispenser comprising: a hollow container having a top opening and a bottom opening; a top lid mounted detachably on and covering the top opening of the container; a bottom lid mounted on and covering the bottom opening of the container and having multiple through holes formed through the bottom lid and communicating with the bottom opening of the container; a receiving plate connected to the bottom lid and having an inner surface separated from an outer surface of the bottom lid to form a gap between the receiving plate and the bottom lid, and having multiple through holes formed through the receiving plate; and a distribution panel attached to the container, mounted between the bottom opening of the container and the bottom lid and having multiple distributing holes formed through the distribution panel and selectively aligning with the through holes of the bottom lid; wherein the bottom lid has a connecting protrusion formed on the outer surface of the bottom lid; and the receiving plate has a mounting tube formed on the inner surface of the receiving plate and mounted around the connecting protrusion of the bottom lid.

2. The pet food dispenser as claimed in claim 1, wherein the top lid has multiple orifices formed through the top lid.

3. The pet food dispenser as claimed in claim 1, wherein
the container has a top threaded part and a bottom threaded part respectively formed on a sidewall of the container;
the top lid has an inner threaded part screwed on the top threaded part of the container;
the bottom lid has an inner threaded part screwed on the bottom threaded part of the container;
the connecting protrusion of the bottom lid has an outer threaded part;
the mounting tube of the receiving plate has an inner threaded part screwed on the outer threaded part of the connecting protrusion.

4. The pet food dispenser as claimed in claim 1, wherein the receiving plate is curved.

* * * * *